(12) United States Patent
Ben-Tzur

(10) Patent No.: US 10,037,375 B2
(45) Date of Patent: Jul. 31, 2018

(54) TRANSMITTING CARD OBJECTS BASED ON CATEGORIZED AND SCRAPED DATA

(71) Applicant: Samsung Electronics Co., Ltd., Suwon-si, Gyeonggi-do (KR)

(72) Inventor: Jonathan Ben-Tzur, Sunnyvale, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 326 days.

(21) Appl. No.: 14/838,877

(22) Filed: Aug. 28, 2015

(65) Prior Publication Data

US 2017/0060981 A1 Mar. 2, 2017

(51) Int. Cl.
| | |
|---|---|
| G06F 17/30 | (2006.01) |
| G06F 3/0482 | (2013.01) |
| G06F 3/0484 | (2013.01) |
| G06F 17/22 | (2006.01) |
| G06F 17/24 | (2006.01) |

(52) U.S. Cl.
CPC ...... *G06F 17/30598* (2013.01); *G06F 3/0482* (2013.01); *G06F 3/0484* (2013.01); *G06F 17/2211* (2013.01); *G06F 17/2247* (2013.01); *G06F 17/243* (2013.01); *G06F 17/30312* (2013.01); *G06F 17/30876* (2013.01); *G06F 17/30887* (2013.01)

(58) Field of Classification Search
CPC ......... G06F 17/30864; G06F 17/30598; G06F 17/30601; G06F 17/30929; G06F 17/30253; G06F 17/30705

USPC .................. 707/737, 709, 767, 723, 999.003
See application file for complete search history.

(56) References Cited

U.S. PATENT DOCUMENTS

| | | | | |
|---|---|---|---|---|
| 7,908,287 | B1* | 3/2011 | Katragadda | G06F 3/0237 |
| | | | | 707/723 |
| 8,498,987 | B1* | 7/2013 | Zhou | G06F 17/30946 |
| | | | | 707/741 |
| 2008/0077570 | A1* | 3/2008 | Tang | G06F 17/30684 |
| 2008/0126335 | A1* | 5/2008 | Gandhi | G06F 17/30622 |
| 2008/0208868 | A1* | 8/2008 | Hubbard | G06F 17/30867 |
| 2010/0169343 | A1* | 7/2010 | Kenedy | G06F 17/30867 |
| | | | | 707/758 |
| 2011/0055699 | A1* | 3/2011 | Li | G06F 17/30864 |
| | | | | 715/709 |
| 2013/0151561 | A1* | 6/2013 | Pfeifle | G06F 17/30542 |
| | | | | 707/780 |
| 2013/0254181 | A1* | 9/2013 | Balassanian | G06F 17/30864 |
| | | | | 707/709 |

(Continued)

*Primary Examiner* — Dung K Chau
(74) *Attorney, Agent, or Firm* — Jefferson IP Law, LLP

(57) ABSTRACT

A server configured to receive data corresponding with a web page and/or a native application, the data comprising a uniform resource locator (URL); compare the URL included in the data with URL patterns stored in a category data store; determine a data category of the data based on the comparison; determine a data scraper based on the data category, the data scraper comprising a scraper configuration that enables the data scraper to extract information from the web page and/or the native application; scrape the web page and/or the native application by extracting information from the web page and/or the native application using the data scraper; store the extracted information in one or more data stores; used the stored information to provide search results and/or card objects.

30 Claims, 6 Drawing Sheets

(56) References Cited

U.S. PATENT DOCUMENTS

| | | | | |
|---|---|---|---|---|
| 2014/0149846 A1* | 5/2014 | Ansel | ............... | G06F 17/3089 |
| | | | | 715/234 |
| 2014/0316890 A1* | 10/2014 | Kagan | ............... | G06Q 30/0275 |
| | | | | 705/14.54 |
| 2014/0331124 A1* | 11/2014 | Downs | ............... | G06F 17/212 |
| | | | | 715/243 |
| 2014/0351091 A1* | 11/2014 | He | ............... | G06Q 30/0625 |
| | | | | 705/26.62 |
| 2016/0188716 A1* | 6/2016 | Rosenberg | ............... | G06F 17/30864 |
| | | | | 707/709 |
| 2016/0335333 A1* | 11/2016 | Desineni | ............... | G06F 17/30156 |
| 2017/0024655 A1* | 1/2017 | Stowell | ............... | G06N 5/04 |

* cited by examiner

TRANSMITTING CARD OBJECTS BASED ON CATEGORIZED AND SCRAPED DATA

TECHNICAL FIELD

This disclosure relates to transmitting card objects based on categorized and scraped data.

BACKGROUND

Some data scrapers extract data from human-readable information displayed by a website. For example, some search systems employ data scrapers to gather information displayed by websites and use the gathered information to provide search results. Scrapers often rely on structural elements of a webpage to identify and extract data. Different web pages often require different scrapers because of different page structures. Using the same scraper for different web pages may lead to erroneous data extraction and building custom scrapers can be time-consuming.

SUMMARY

One aspect of the disclosure provides a server that includes a network communication device, a storage device and a processing device. The storage device may store a category data store that stores category records corresponding with data categories. Each category record may include a category identifier (ID) that identifies the category record and a uniform resource locator (URL) pattern associated with the data category. The storage device may store an entity data store that stores entity records and a card data store that stores card records. The processing device executes computer-readable instructions that, when executed by the processing device, cause the processing device to receive data corresponding with a web page and/or a native application. The data may include a uniform resource locator (URL). The processing device compares the URL included in the data with the URL patterns stored in the category data store. The processing device determines a data category of the data based on the comparison of the URL with the URL patterns.

The processing device determines a data scraper based on the data category of the data. The data scraper may include a scraper configuration that enables the data scraper to extract information from the web page and/or the native application. The processing device uses the data scraper to scrape the web page and/or the native application by extracting information from the web page and/or the native application using the data scraper. The processing device populates one or more entity records in the entity data store and/or one or more card records in the card data store based on the scraped data. The processing device may receive a card request (e.g., a search request). The card request may include one or more search terms and/or contextual data. The processing device determines a card record from the card data store based on the card request. The processing device generates a card object based on the determined card record and transmits the card object via the network communication device.

Another aspect of the disclosure provides a server that includes a network communication device, a storage device and a processing device. The storage device may store a category data store that stores category records corresponding with data categories. Each category record comprising may include a category identifier (ID) that identifies the category record and a structural pattern associated with the data category. The structural pattern may indicate the structure of a web page and/or a native application. The storage device may store an entity data store that stores entity records and a card data store that stores card records. The processing device executes computer-readable instructions that, when executed by the processing device, cause the processing device to receive data corresponding with a web page and/or a native application. The data may include metadata that indicates a structure of the web page and/or the native application. The processing device compares the structure indicated by the metadata with the structural patterns stored in the category data store and determines a data category of the data based on the comparison.

The processing device determines a data scraper based on the data category of the data. The data scraper may include a scraper configuration that enables the data scraper to extract information from the web page and/or the native application. The processing device scrapes the web page and/or the native application by extracting information from the web page and/or the native application using the data scraper. The processing device populates one or more entity records in the entity data store and/or one or more card records in the card data store based on the scraped data. The processing device receives a card request (e.g., a search request). The card request may include one or more search terms and/or contextual data. The processing device determines a card record from the card data store based on the card request and generates a card object based on the determined card record. The processing device transmits the card object via the network communication device.

Another aspect of the disclosure provides a server that includes a network communication device, a storage device and a processing device. The storage device stores a category data store that stores category records corresponding with data categories. Each category record may include a category identifier (ID) that identifies the category record and metatag patterns associated with the data category. The metatag patterns may indicate the content displayed by a web page and/or a native application. The storage device may store an entity data store that stores entity records. The processing device executes computer-readable instructions that, when executed by the processing device, cause the processing device to receive data corresponding with a web page and/or a native application. The data may include metadata that includes metatag pairs. Each metatag pair may include a tag label and a value interposed between the metatag pair. The processing device compares the identified tag labels with the metatag patterns stored in the category data store and determines a data category of the data based on the comparison.

The processing device determines a data scraper based on the data category of the data. The data scraper may include a scraper configuration that enables the data scraper to extract information from the web page and/or the native application. The processing device scrapes the web page and/or the native application by extracting information from the web page and/or the native application using the data scraper. The processing device populates one or more entity records in the entity data store based on the scraped data. The processing device receives a search request (e.g., a card request). The search request may include one or more search terms and/or contextual data. The processing device determines one or more entity records from the entity data store based on the search request. The processing device generates a result object based on the determined entity records and transmits the result object via the network communication device.

Yet another aspect of the disclosure provides a server that includes a network communication device, a storage device and a processing device. The storage device stores an entity data store that stores entity records. The processing device executes computer-readable instructions that, when executed by the processing device, cause the processing device to receive data corresponding with n states of a web page and/or a native application. N may be greater than two. The data may include n uniform resource locators (URLs) associated with respective states. The processing device compares the data of the n states with each other to determine similarity between the n states. The processing device clusters the n states into k clusters based on the comparison, where k is less than n and greater than one. For each cluster, the processing device may determine a data scraper based on the structure of the data in the cluster and use the data scraper to scrape the states of the web page and/or the native application indicated by the URLs in the cluster. The processing device populates one or more entity records in the entity data store using the scraped data. The processing device receives a search request (e.g., a card request). The search request may include one or more search terms and/or contextual data. The processing device determines one or more entity records from the entity data store based on the search request and generates a result object based on the determined entity records. The processing device transmits the result object via the network communication device.

A further aspect of the disclosure provides a server that includes a network communication device, a storage device and a processing device. The storage device stores an entity data store that stores entity records and a card data store that stores card records. The processing device executes computer-readable instructions that, when executed by the processing device, cause the processing device to receive data corresponding with a web page and/or a native application. The data may include a uniform resource locator (URL), metadata indicating a structure of the web page and/or the native application, and/or content displayed by the web page and/or the native application. The processing device determines a category of the data based on the URL of the web page and/or the native application, the structure of the web page and/or the native application indicated by the metadata, and/or the content displayed by the web page and/or the native application.

The processing device determines a scraper based on the category of the data. The scraper may include a configuration that enables the scraper to extract information from the web page and/or the native application. The processing device scrapes the web page and/or the native application by extracting information from the web page and/or the native application using the scraper. The processing device populates one or more entity records in the entity data store and/or one or more card records in the card data store based on the scraped data.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
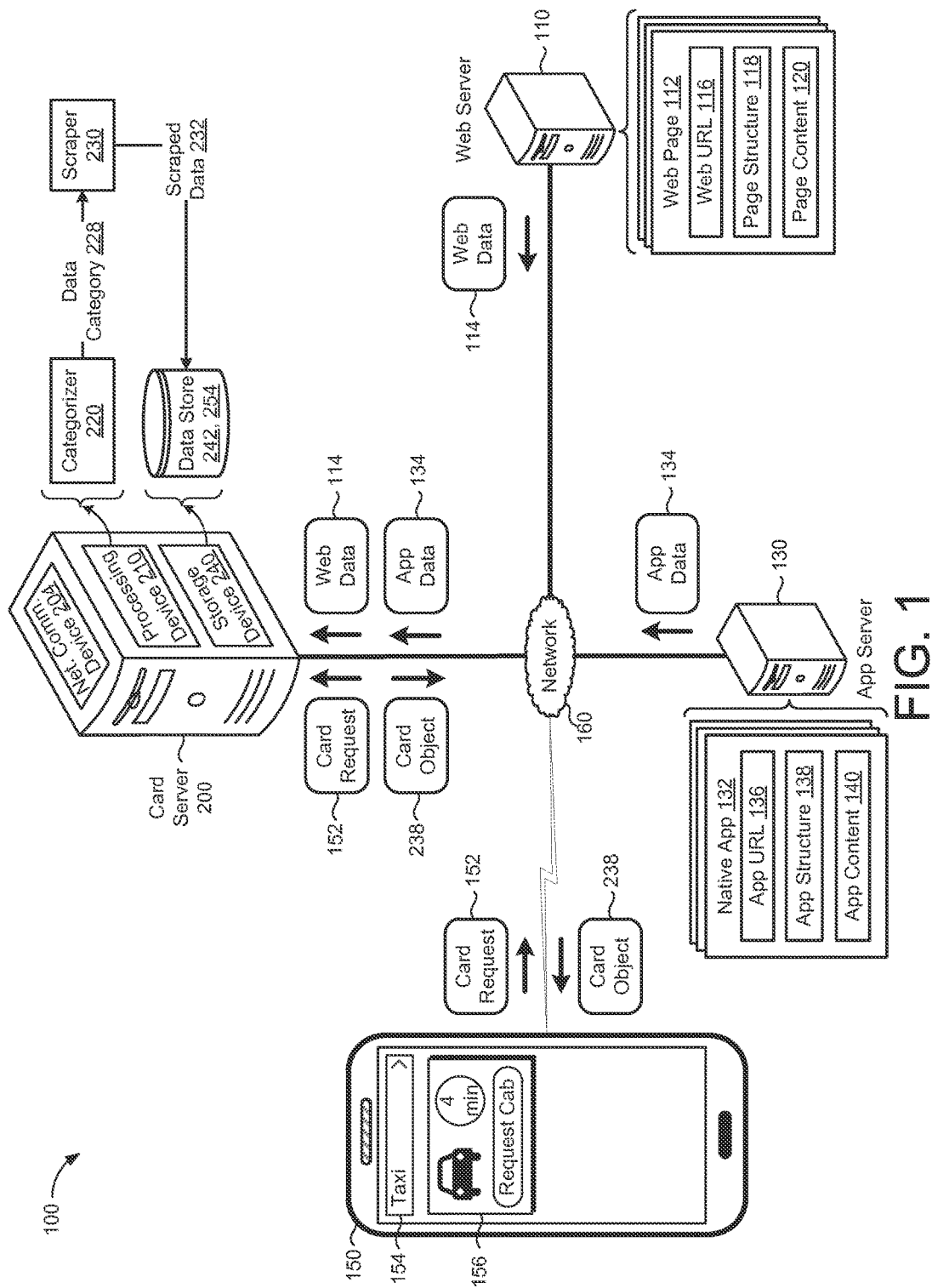
FIG. 1 is a schematic diagram of an example system that enables category-based scraping.

Data scrapers can be used to extract information from web pages and native applications. The extracted information may be used to provide search results in response to a search request. To extract the information from a web page, a scraper may rely on HTML tags or HTML attributes that indicate a structure of the web page. For example, a scraper configuration file may instruct a scraper to extract a movie title stored between the <div class="movie-title"> tag and its corresponding </div> tag. The scraper configuration file may instruct the scraper to extract additional information from the website. For example, the scraper may extract a movie poster indicate by an <img> tag and store it as the movie poster.

Some scrapers place excessive reliance on the HTML structure of a page. However, the HTML structure of the page can change depending on the information that is displayed. Hence, scrapers that rely on the HTML structure may malfunction by extracting erroneous data or by not extracting any data at all. For example, a scraper configuration file may instruct the scraper to extract a movie title embedded between the third set of <div> tags and to extract a movie poster embedded between the seventh set of <div> tags. This scraper may not function properly, for example, if some movies do not have a movie poster and the seventh set of <div> tags are missing or contain some other information. This scraper may also malfunction, if the movie poster is embedded between a different set of <div> tags (e.g., the sixth set of <div> tags or the eight set of <div> tags).

The present disclosure provides a server that receives unscraped data (e.g., from a crawler) and determines a data category of the unscraped data before applying any scrapers to scrape the unscraped data. After determining the data category, the server applies a scraper that is suitable for scraping that data category. Using different scrapers for different data categories may prevent erroneous data extraction. In the movie example, the server may categorize the unscraped data into a 'movie with poster' category or a 'movie without poster' category. For the 'movie with poster' category, the server may use a scraper that extracts the movie name from the third set of <div> tags and the movie poster from the seventh set of <div> tags. For the 'movie without poster' category, the server may use another scraper that extracts the movie name from the third set of <div> tags and does not attempt to extract the movie poster from the seventh set of <div> tags because there is no movie poster. By using a different scraper for the 'movie without poster' category, the server does not erroneously extract the information in the seventh set of <div> tags as the movie poster.

The crawled data may correspond with a web page and/or a native application that can be installed at client computing devices. The crawled data may include an access mechanism, such as a uniform resource locator (URL) or an application resource identifier (ARI) that identifies a resource (e.g., a state) of a native application. Additionally or alternatively, the crawled data may include metadata that indicates a structure of the web page and/or the native application. Additionally or alternatively, the crawled data may include content displayed by the web page and/or the native application. The server may determine the data category based on the URL. For example, the server may compare the URL with URL patterns associated with known data categories. Additionally or alternatively, the server may determine the data category based on the metadata. For example, the server may compare metatags in the metadata with tag patterns associated with known data categories. Similarly, the server may determine the data category based on the content. For example, the server may compare the content with stored content associated with known data categories. The crawled data may include HTML structures or non-HTML, such as JSON structures, XML structures, etc.

The server may use the scraped data to provide card objects in response to card requests. For example, the server can use the scraped data to populate card records in a card data store. Upon receiving a card request, the server can search the card data store for a suitable card record, use the card record to generate a card object and transmit the card object. A card object may refer to a data container (e.g., JSON file, XML file, etc.) that includes information that a mobile computing device can use to display cards. Additionally or alternatively, the server may use the scraped data to provide search results in response to a search request. For example, the server may use the scraped data to populate entity records in an entity data store. Upon receiving a search request, the server can search the entity data store for suitable entity records, rank the entity records and transmit a search result object that includes information from the highest ranked entity records.

FIG. 1 illustrates an example system 100 that enables category-based data scraping. The system 100 may include a web server 110 that hosts web pages 112, an application server 130 that stores information related to native applications 132, a client computing device 150, a network 160 and a card server 200. In operation, the card server 200 receives web data 114 from the web server 110 and/or application data 134 from the application server 130. The card server 200 categorizes the web data 114 and/or the application data 134. The card server 200 uses category-specific scrapers to scrape the web data 114 and/or the application data 134. The card server 200 stores the scraped data in a data store and uses the scraped data to provide card objects 238 (e.g., search results) to the client computing device 150 in response to receiving a card request 152 (e.g., search request).

The web server 110 hosts web pages 112. The web pages 112 include web uniform resource locators (URLs) 116 that may be used to access the web pages 112. Additionally, the web pages 112 include Hyper Text Markup Language (HTML) tags that indicate a page structure 118. The page structure 118 may include graphical user interface (GUI) elements of the web page 112. For example, the page structure 118 of a particular web page 112 may indicate whether the web page 112 includes an image. The page structure 118 may indicate text fields, drop-down menus or buttons on the web page 112. The web pages 112 also include page content 120 that is displayed on the web pages 112. The HTML tags may indicate the page content 120. For example, some HTML tag labels may indicate the type of content stored between the HTML tags. The web pages 112 may use a schema vocabulary to indicate the content type. For example, some web pages 112 may be labeled according to the schema defined in schema.org, maintained by a steering group that includes various companies, individuals and W3C. The web data 114 may include the web URL 116, the page structure 118 and/or the page content 120. The web pages 112 may correspond with different websites. Alternatively, the web pages 112 may correspond with different states of a particular website.

The application server 130 stores information related to the native applications 132. The native applications 132 may be installed on the client computing device 150 and the application server 130 may serve data to the native applications 132 in response to receiving requests from the native applications 132. Alternatively, the application server 130 may be a digital distribution platform that enables the client computing device 150 to download the native applications 132. Additionally, the application server 130 may receive application programming interface (API) calls from the native applications 132 when the native applications 132 are executing on the client computing device. The native applications 132 may include one or more application URLs 136. Each application URL 136 may correspond with a different state of the native application. The application URL 136 for a particular state may enable the client computing device to directly access the particular state without navigating through menus to arrive at the particular state. The application URLs 136 may be referred to as state access mechanisms, for example, because they enable direct access to a corresponding state of the native application 132.

The native applications 132 may include an application structure 138. Similar to the page structure 118, the application structure 138 indicates the GUI elements displayed by the native application 132. The native application 132 may include a file that indicates the application structure 138. For example, a native application configured for the ANDROID operating system, maintained by Google, Inc. may include a manifest that defines the structure of the native application. The native applications 132 may include application content 140 that is displayed by the native applications. The native applications 132 may use a schema vocabulary (e.g., a vocabulary defined by schema.org or a custom schema) to indicate the type of content displayed by the native application 132. The application data 134 may include the application URL(s) 136, the application structure 138 and/or the application content 140. The application server 130 may send the application data 134 to the card server periodically or in response to receiving a request from the card server 200.

The client computing device 150 sends a card request 152 to the card server 200. The card request 152 may include a search query 154 with one or more search terms. Additionally or alternatively, the card request 152 may include contextual data (e.g., location, installed native applications, active application, etc.). In response to sending the card request 152, the client computing device 150 receives a card object 238 from the card server 200. The client computing device 150 uses the card object 238 to display one or more cards 156 that can be used to perform tasks. For example, the card 156 may define a graphical user interface that allows a user to request a taxicab. The client computing device 150 may include a native application 132 and the card 156 may correspond with the native application 132. For example, the card 156 may serve as a frontend interface for the native application 132. Additionally or alternatively, the card 156 may interact with (e.g., make API calls to) a web page 112 to perform the task.

The card server 200 includes a network communication device 204, a processing device 210 and a storage device 240. The network communication device 204 receives the web data 114 from the web server 110 and/or the application data 134 from the application server 130. The processing device 210 executes a categorizer 220 that determines a data category 228 of the web data 114 and/or the application data 134. The processing device 210 executes a scraper 230 that uses the data category 228 to determine a category-specific scraper. The scraper 230 uses the category-specific scraper to extract scraped data 232 from the web data 114 and/or the application data 134.

The storage device 240 stores an entity data store 242 and a card data store 254. The processing device 210 can write the scraped data 232 to the entity data store 242 and/or the card data store 254. The processing device 210 uses the scraped data 232 to generate the card object 238. For example, the card object 238 may include information from the entity data store 242 and/or the card data store 254.

Figure 2:
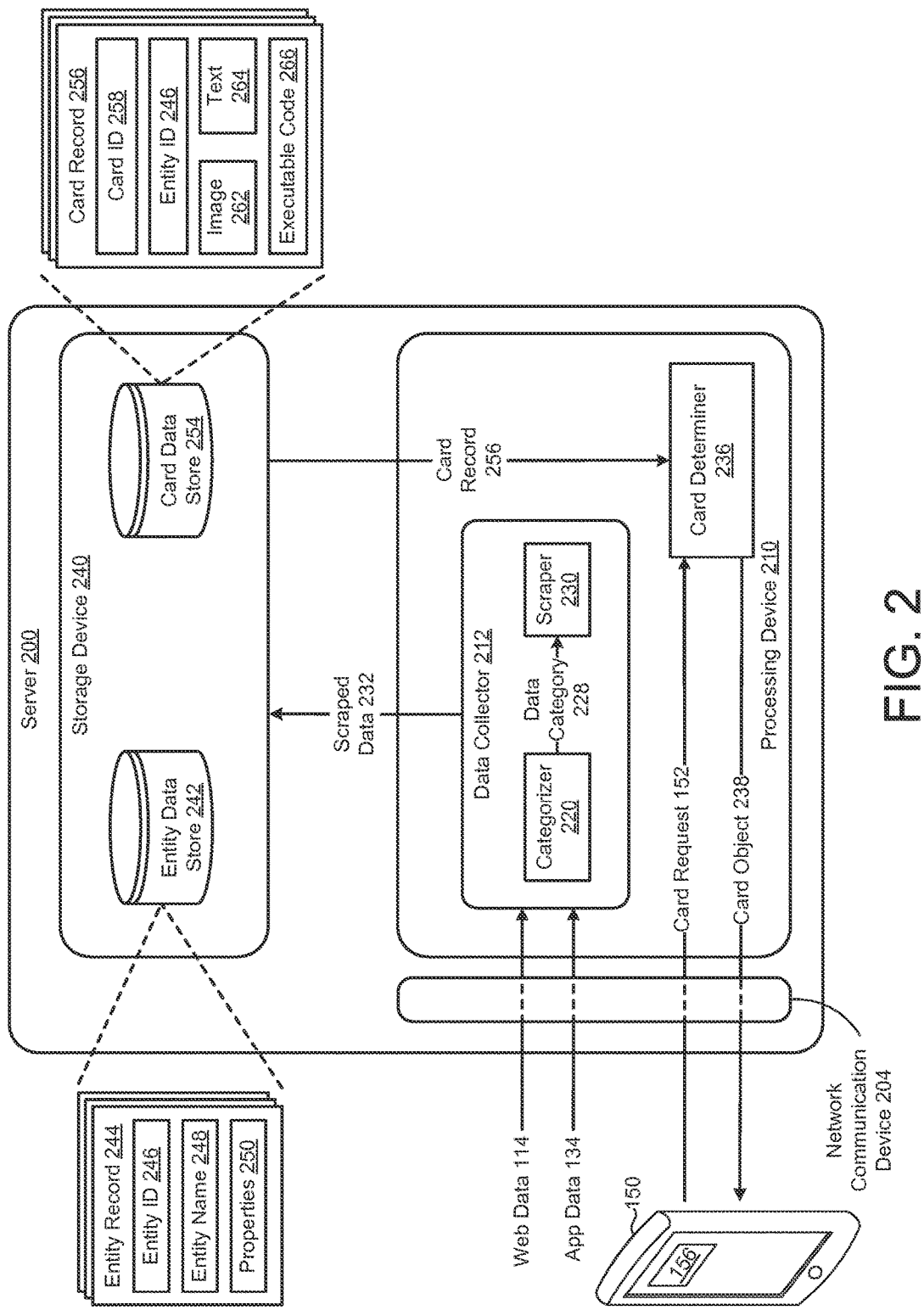
FIG. 2 is a block diagram that illustrates an example implementation of the card server shown in FIG. 1.

FIG. 2 illustrates an example implementation of the card server 200. The card server 200 may be implemented by a cloud computing platform. The cloud computing platform may include a collection of remote computing services. The cloud computing platform may include computing resources (e.g., processing device 210). The computing resources may include physical servers that have physical central processing units (pCPUs). The cloud computing resources may include storage resources (e.g., storage device 240). The storage resources may include database servers that support NoSQL, MySQL, Oracle, SQL Server, or the like. The cloud computing platform may include networking resources (e.g., network communication device 204). For example, the networking resources may distribute incoming requests for event notifications across multiple virtual private servers. Example cloud computing platforms include Amazon Web Services®, and Google Cloud Platform®.

The network communication device 204 communicates with a network (e.g., the network 160 shown in FIG. 1). The network communication device 204 may include a communication interface that performs wired communication (e.g., via Ethernet, Universal Serial Bus (USB) or fiber-optic cables). The network communication device 204 may perform wireless communication (e.g., via Wi-Fi, a cellular network, or satellites). The network communication device 204 may include a transceiver. The transceiver may operate in accordance with an Institute of Electrical and Electronics Engineers (IEEE) specification (e.g., IEEE 802.3 or IEEE 802.11). The transceiver may operate in accordance with a 3rd Generation Partnership Project (3GPP) specification (e.g., Code Division Multiple Access (CDMA), Long Term Evolution (LTE) or LTE-Advanced). The transceiver may operate in accordance with a Universal Serial Bus (USB) specification (e.g., via a USB port).

The storage device 240 stores data. The storage device 240 may include one or more computer readable storage mediums. For example, the storage device 240 may include solid state memory devices, hard disk memory devices, optical disk drives, read-only memory and/or nanotube-based storage devices. The storage device 240 may be connected to the processing device 210 via a bus and/or a network. Different storage mediums within the storage device 240 may be located at the same physical location (e.g., in the same data center, same rack, or same housing). Different storage mediums of the storage device 240 may be distributed (e.g., in different data centers, different racks, or different housings). The storage device 240 may implement (e.g., store) an entity data store 242 and a card data store 254.

The entity data store 242 stores entity records 244 that correspond with entities. An entity may be a logical object or item. Example entities include restaurants, movies, books, songs, native applications, people, addresses, and the like. An entity record 244 may include an entity identifier (ID) 246 that identifies the entity, an entity name 248 and properties 250 of the entity. The properties 250 may indicate a type for the entity. For example, the properties 250 may indicate that the entity record 244 corresponds with a movie type entity. The properties 250 may include keywords associated with the entity record 244. The entity records 244 may be used to generate search results in response to a search request. The entity data store 242 may also include one or more databases, indices (e.g., inverted indices), tables, Look-Up Tables (LUT), files, and/or other data structures. For example, the entity data store 242 may include an inverted index that indexes the entity names 248 to the entity records 244.

The card data store 254 stores card records 256. A card record 256 may correspond with a card 156 displayed by the client computing device 150. A card record 256 may include a card ID 258 that identifies the card record 256, an image 262 that may be referred to as a card image and text 264 that may be referred to as a card label. The card record 256 may include executable code 266 that can be executed by the client computing device 150 to render the card 156 and perform the task (e.g., function) associated with the card 156. A card record 256 may correspond with an entity record 244. The card record 256 may include the entity ID 246 of its corresponding entity record 244. For example, a particular entity record 244 may correspond with a movie entity and the card record 256 corresponding with the movie entity can include a movie poster (e.g., as image 262), a movie synopsis, a movie rating, movie cast, etc. (e.g., as text 264). In the movie entity example, the executable code 266 may enable a user of the client computing device 150 to watch a movie trailer for the movie entity or buy tickets for the movie. The card data store 254 may include one or more databases, indices (e.g., inverted indices), tables, Look-Up Tables (LUT), files, or other data structures. For example, the card data store 254 may include an inverted index that indexes the entity IDs 246 and/or the text 264 to the card records 256.

The processing device 210 may include a collection of one or more computing processors that execute computer readable instructions. The computing processors of the processing device 210 may operate independently or in a distributed manner. The computing processors may be connected via a bus and/or a network. The computing processors may be located in the same physical device (e.g., same housing). The computing processors may be located in different physical devices (e.g., different housings, for example, in a distributed computing system). A computing processor may include physical central processing units (pCPUs). A pCPU may execute computer-readable instructions to implement virtual central processing units (vCPUs). The processing device 210 executes a data collector 212 and a card determiner 236. The processing device 210 may execute the data collector 212 and the card determiner 236 by executing computer-readable instructions corresponding with the data collector 212 and the card determiner 236, respectively.

The data collector 212 enables the card server 200 to collect data that the card server 200 can use to serve cards 156 to client computing devices 150. The data collector 212 receives the web data 114 and the application data 134 from a crawler (now shown). The card server 200 may include the crawler or the crawler may be external to the card server 200. The crawler crawls websites and native applications to gather the web data 114 and the application data 134, respectively. The data collector 212 may include the categorizer 220 that determines the data category 228 and the scraper 230 that extracts the scraped data 232. The data collector 212 stores the scraped data 232 as entity records 244 in the entity data store 242 and/or as card records 256 in the card data store 254.

The card determiner 236 receives the card request 152 and determines a card record 256 based on the card request 152. The card request 152 may include one or more search terms.

an image (e.g., a movie poster) at the top left corner. The structural pattern 280 of the movie category may further specify text beside the image (e.g., a movie title) or under the image (e.g., a movie synopsis). The structural pattern 280 of the movie category may further specify one or more videos below the image (e.g., movie trailers).

The categorized content 284 may indicate a portion of the page content 120 that can be categorized under the data category 228 represented by the category record 272. Similarly, the categorized content 284 may indicate a portion of the application content 140 that can be categorized under the data category 228 represented by the category record 272. The categorized content 284 may include a list of metatags that can be used to identify the data category and specific data fields in accordance with a schema vocabulary (e.g., schema.org). For example, the categorized content 284 for a category record 272 that represents a movie category may include one or more of the following metatags.

| Content | Example Metatags for Movie Category |
|---|---|
| Movie | <div...itemscope itemtype="http://sehema.org/Movie"> |
| Movie name | ...itemprop="name"> |
| Description | ...itemprop="description"> |
| Director | ...itemprop="director" itemscope itemtype="http://schema.org/Person" |
| Actor(s) | ...itemprop="actor" itemscope itemtype="http://schema.org/Person"> |
| Movie Rating | ...itemprop="aggregateRating"..."http://schema.org/AggregateRating" |
| Trailer | ...itemprop="trailer"> |

The card determiner 236 may access the card data store 254 and retrieve a card record 256 that matches with the search terms. For example, the card determiner 236 may use an inverted index that indexes keywords to card records 256. Alternatively or additionally, the card determiner 236 may search the entity data store 242 for a suitable entity record 244 and retrieve the card record 256 corresponding with the selected entity record 244. The card determiner 236 may use various scoring features to score (e.g., rank) the entity records 244 and/or the card records 256, and select the card record(s) based on the scores. The card determiner 236 may transmit the selected card record(s) to the client computing device 150 via the card object 238. The card object 238 may be a data container for the selected card record(s) (e.g., a JavaScript Object Notation (JSON) file).

Figure 3:
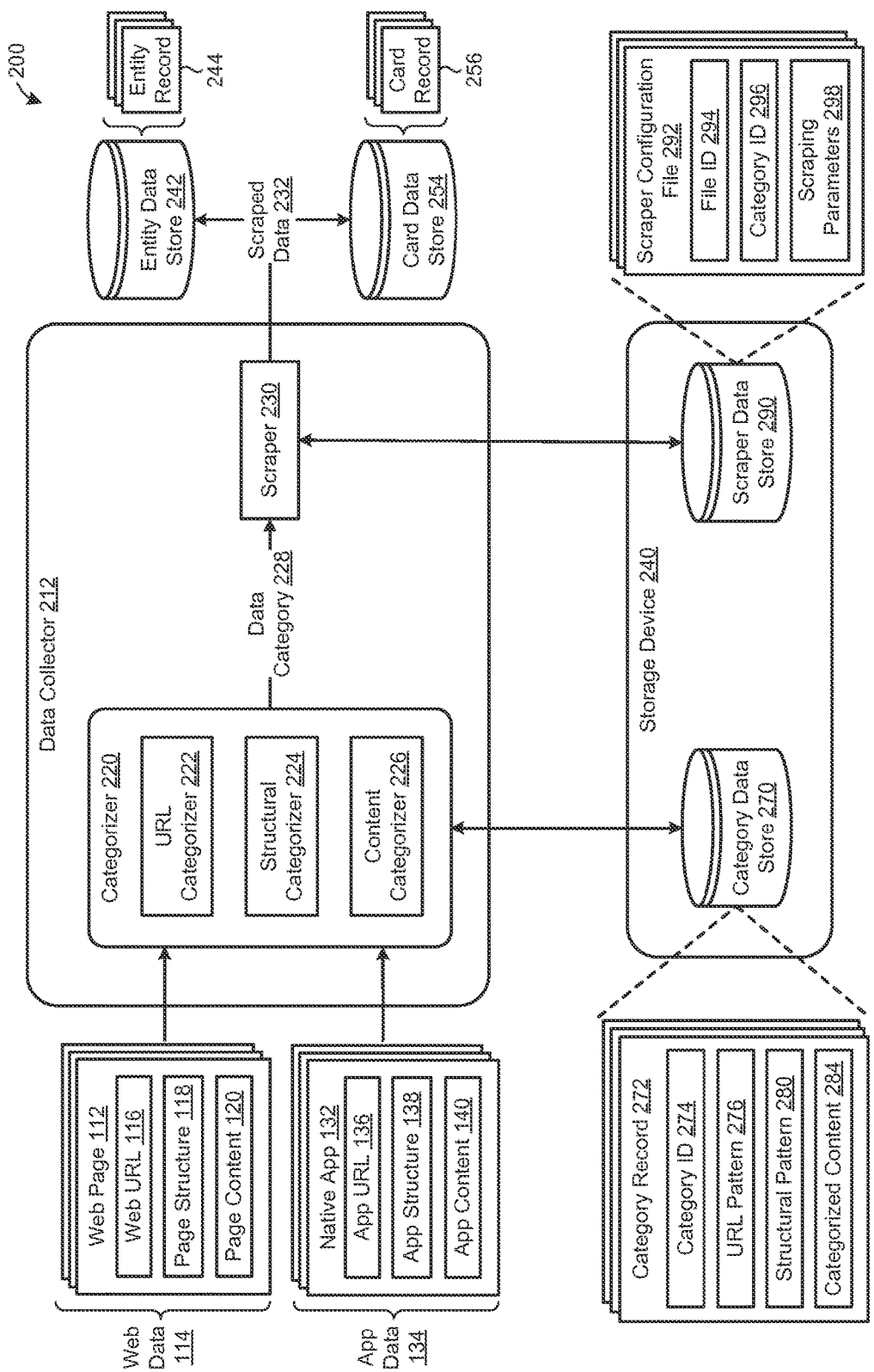
FIG. 3 is a block diagram that illustrates another example implementation of the server shown in FIGS. 1 and 2.

FIG. 3 illustrates another example implementation of the server 200. The storage device 240 may include a category data store 270 that stores category records 272 that represent different data categories 228. A category record 272 may include a category ID 274 that identifies the category record 272, a URL pattern 276, a structural pattern 280 and/or categorized content 284. The URL pattern 276 may indicate a portion of the web URL 116 that can be categorized under the data category 228 represented by the category record 272. Similarly, URL pattern 276 may indicate a portion of the application URL 136 that can be categorized under the data category 228 represented by the category record 272. For example, a category record 272 that represents a movie category may include " . . . /movie/id= . . . ", " . . . /title/tt0 . . . " or " . . . /movieoverview" in the URL pattern 276. The structural pattern 280 may indicate a portion of the page structure 118 that can be categorized under the data category 228 represented by the category record 272. Similarly, the structural pattern 280 may indicate a portion of the application structure 138 that can be categorized under the data category 228 represented by the category record 272. For example, a category record 272 that represents a movie category may include a structural pattern 280 that specifies The category data store 270 may include one or more databases, indices (e.g., inverted indices), tables, Look-Up Tables (LUT), files, or other data structures. For example, the category data store 270 may include an inverted index that indexes the URL patterns 276, the structural patterns 280 and/or the categorized content 284 (e.g., the metatags) to the category records 272.

The storage device 240 may store a scraper data store 290 that stores scraper configuration files 292 that may be used by the scraper 230 to extract the scraped data 232 from the web page(s) 112 and/or the native application(s) 132. The scraper configuration files 292 may correspond with different data categories 228. A scraper configuration file 292 may include a file identifier (ID) 294 that identifies the scraper configuration file 292. The scraper configuration file 292 may include a category ID 296 that identifies the data category 228 associated with the scraper configuration file 292. A scraper configuration file 292 may include scraping parameters 298 that the scraper 230 can use to extract the scraped data 232. The scraping parameters 298 may instruct the scraper 230 on the type of data (e.g., images or text) or the amount of data (e.g., in kB, MB or GB, or number of characters or words) to extract. The scraping parameters 298 may specify where the scraper 230 can extract the scraped data 232 from. For example, the scraping parameters 298 of the movie category may instruct the scraper 230 to extract a movie title from the third <div> tag and a movie image from the seventh <div> tag.

The categorizer 220 may include a URL categorizer 222 that determines the data category 228 based on the web URL 116 and/or the application URL 136. The URL categorizer 222 may compare the web URL 116 and/or the application URL 136 of a crawled state (e.g., a web URL 116 corresponding to a document defining a webpage) with the URL patterns 276. Upon determining a match between a particular URL pattern 276, and the web URL 116 and/or the application URL 136, the URL categorizer 222 can select the data category 228 associated with the matching URL pattern 276. The URL categorizer 222 may utilize an inverted index that indexes the URL patterns 276 to the category records 272. For instance, the URL categorizer 222 may determine Levenshtein distances between the URL patterns 276, and the web URL 116 and/or the application URL 136. The URL categorizer 222 may select the data category 228 associated with the URL pattern 276 with the lowest (e.g., smallest) Levenshtein distance.

The categorizer 220 may include a structural categorizer 224 that determines the data category 228 based on the page structure 118 and/or the application structure 138. The structural categorizer 224 may compare the page structure 118 and/or the application structure 138 with the structural patterns 280. Upon determining a match between a particular structural pattern 280, and the page structure 118 and/or the application structure 138, the structural categorizer 224 can select the data category 228 associated with the matching structural pattern 280. The structural categorizer 224 may utilize an inverted index that indexes the structural patterns 280 to the category records 272. For example, the structural categorizer 224 can query the inverted index using portions of the page structure 118 and receive category record identifiers that identify the category records 272. The structural categorizer 224 may determine Levenshtein distances between the structural patterns 280, and the page structure 118 and/or the application structure 138. The structural categorizer 224 may select the data category 228 associated with the structural pattern 280 with the lowest (e.g., smallest) Levenshtein distance.

The categorizer 220 may include a content categorizer 226 that determines the data category 228 based on the page content 120 and/or the application content 140. The content categorizer 226 may compare the page content 120 and/or the application content 140 with the categorized content 284 (e.g., categorized metatags). Upon determining a match between a particular categorized content 284, and the page content 120 and/or the application content 140, the content categorizer 226 can select the data category 228 associated with the matching categorized content 284. The content categorizer 226 may utilize an inverted index that indexes the categorized content 284 (e.g., categorized metatags) to category records 272. The content categorizer 226 may determine Levenshtein distances between the categorized content 284, and the page content 120 and/or the application content 140. The content categorizer 226 may select the data category 228 associated with the categorized content 284 with the lowest (e.g., smallest) Levenshtein distance.

The scraper 230 determines (e.g., scrapes) the scraped data 232 based on the data category 228. The scraper 230 may determine a category-specific data scraper based on the data category 228. The scraper 230 may determine the category-specific data scraper by retrieving a scraper configuration file 292 that corresponds with the data category 228 and configuring the scraper 230 with the scraping parameters 298 in the scraper configuration file 292. The scraper 230 may retrieve the scraper configuration file 292 by utilizing an inverted index that indexes category IDs 296 to the scraper configuration files 292. For example, the scraper 230 may compare the category ID 296 of the data category 228 with the indexed category IDs 296 and retrieve the scraper configuration file 292 associated with an indexed category ID 296 that matches the category ID 296 of the data category 228.

The scraper 230 may scrape (e.g., extract) the scraped data 232 in accordance with the scraping parameters 298 in the scraper configuration file 292. The scraping parameters 298 may indicate which data to extract from the web data 114 and/or the application data 134. For example, the scraping parameters 298 may indicate the data fields or images that the scraper 230 may extract data from. The scraper 230 may store the scraped data 232 in the entity data store 242 and/or the card data store 254, for example, so that the scraped data 232 may be used to provide search results (e.g., cards). The scraping parameters 298 may indicate where the scraper 230 can store the scraped data 232. For example, the scraping parameters 298 may indicate the scraper 230 to store the scraped data 232 in the entity record(s) 244 and/or the card record(s) 256. The scraper 230 may store the scraped data 232 in existing entity records 244 and/or existing card records 256. Alternatively, the scraper 230 may store the scraped data 232 in a new entity record 244 and/or a new card record 256.

Figure 4A:
FIG. 4A is a block diagram that illustrates example methods for categorizing crawled data and scraping the crawled data based on the data categorization.

FIG. 4 illustrates an example method 400 that may be used to categorize data and extract information from the data based on the data category. The method 400 may be implemented by a server (e.g., the card server 200 shown in FIGS. 1, 2 and 3). At 405, the server receives crawled data corresponding with a web page and/or a native application. The crawled data may include one or more access mechanisms. An access mechanism may include a web access mechanism that includes a string that references a particular state of a website. The web access mechanism may include a web resource identifier, such as a web URL. An access mechanism may include an application access mechanism that include a string that reference a particular state of a native application. The application access mechanism may include an application resource identifier, such as an application URL.

In addition to the URLs, the data may indicate a structure of the web page and/or the native application. For example, the data may indicate that the web page and/or the native application displays a heading (e.g., a movie name) at the top, an image (e.g., a movie poster) below the heading towards the left and text (e.g., a movie synopsis) on the right side of the image. The data may include tags (e.g., metatags, for example, HTML tags, XML tags, JSON tags, etc.) that indicate the structure of the web page and/or the native application. Additionally or alternatively, the data may include activity objects (e.g., activity classes) that indicate the structure of the native application.

The data may indicate the content displayed by the web page and/or the native application. The data may indicate the content by including metatags that include references to a schema vocabulary (e.g., schema.org). The metatags may indicate the type of data that is stored between the metatags. For example, a particular metatag may indicate that the web page or the native application displays information about a movie by specifying: itemscope itemtype="http://schema.org/Movie". Similarly, other metatags may indicate additional information about the movie. For example, another metatag may indicate that the displayed information conveys the name of the movie director by specifying: itemprop="actor" itemscope itemtype="http://schema.org/Person".

At 410, the server determines a category of the crawled data (e.g., a data category). The server may determine the data category based on the URL, at 420. Alternatively or additionally, the server may determine the data category based on the structure indicated by the data, at 430. Alternatively or additionally, the server may determine the data category based on the content indicated by the data, at 440.

Referring to 420, the server can determine the data category based on the URL included in the crawled data. At 422, the server identifies one or more URLs included in the crawled data. The server may identify the URLs by comparing the data with a URL scheme template. For example, the server may identify the beginning portion of a URL (e.g., a web URL) by identifying "http:// . . . ". Additionally or alternatively, the server may identify the beginning portion of a URL (e.g., an application URL) by identifying an application namespace (e.g., "app:/// . . . ", where app may refer to the native application, for example, "yelp:/// . . . " may be a URL for the YELP® native application). The server may use other suitable techniques to identify the URL(s) within the data.

At 424, the server compares the URL(s) in the crawled data with categorized URL patterns. The server may perform the comparison by utilizing an index (e.g., an inverted index) that indexes the URL patterns to category records representing different data categories. Alternatively or additionally, the server may perform the comparison by computing Levenshtein distances between the URL patterns and the URL. The server may use other suitable techniques to compare the URL(s) with the URL patterns.

At 426, the server selects the data category based on the comparison of the URL(s) in the crawled data with the categorized URL patterns. The server may select the data category associated with the URL pattern that matches the URL included in the data. For example, the server may select the data category associated with the URL pattern that has the lowest Levenshtein distance.

Referring to 430, the server may determine the data category based on the structure of the web page and/or the native application. At 432, the server identifies structural elements within the data. Examples of structural elements include graphical user interface (GUI) elements, such as text labels, text fields, images, drop-downs, buttons, etc. The server may identify the structural elements by identifying tags (e.g., metatags, for example, HTML tags, XML tags, JSON tags, etc.). Additionally or alternatively, the server can identify portions of executable code that refer to user interface elements (e.g., an activity class).

At 434, the server compares the structural elements in the crawled data with categorized structural patterns. For example, the server can compare the GUI elements in the data with the GUI elements in the structural patterns. The server may perform the comparison by utilizing an index (e.g., an inverted index) that indexes the structural patterns to category records representing different data categories. Alternatively or additionally, the server may perform the comparison by computing Levenshtein distances between the structural patterns and the structural elements in the data. For example, the server may generate a string to represent the structural elements in the data. Similarly, the server may generate strings to represent the categorized structural patterns. For each structural pattern, the server can compute a Levenshtein distance between the string representing the structural pattern and the string representing the structural elements in the data. The server may use other suitable techniques to compare the structural elements with the structural patterns.

At 436, the server selects a data category associated with a particular structural pattern based on the comparison. The server may select the data category associated with the structural pattern that best matches with the structural elements in the data. The server may select the data category of the structural pattern with the lowest Levenshtein distance.

Referring to 440, the server may determine the data category based on the content (e.g., information) displayed by the web page and/or the native application. At 442, the server can identify tags (e.g., metatags, for example, HTML tags) that refer to structured content. The tags may refer to the structured content by utilizing a schema vocabulary (e.g., schema.org). The tags may indicate the type of content displayed by the web page and/or the native application. For example, a particular tag may indicate that the web page or the native application displays information about a movie by specifying: itemscope itemtype="http://schema.org/Movie". Similarly, other tags may indicate additional information about the movie. For example, another tag may indicate that the displayed information conveys the name of the movie's director by specifying: itemprop="actor" itemscope itemtype="http://schema.org/Person".

At 444, the server compares the content indicated by the crawled data with categorized content (e.g., content associated with different data categories). For example, the server may compare the tags included in the crawled data with categorized metatags (e.g., metatags associated with different data categories). The server may perform the comparison by utilizing an index (e.g., an inverted index) that indexes the categorized content (e.g., the categorized metatags) to category records representing different data categories. Alternatively or additionally, the server may perform the comparison by computing Levenshtein distances between the categorized content (e.g., the categorized metatags) and the content (e.g., tags) indicated by the crawled data. For example, the server may generate a string to represent the content indicated by the data. Similarly, the server may generate strings to represent the categorized content. For each data category, the server can compute a Levenshtein distance between the string representing the corresponding categorized content and the string representing the content in the data. The server may use other suitable techniques to compare the contents.

At 446, the server selects a data category associated with a particular set of categorized content based on the comparison. The server may select the data category associated with the categorized content that best matches the content indicated by the data. Alternatively, the server may select the data category of the categorized content with the lowest Levenshtein distance.

At 450, the server determines a data scraper based on the data category determined at 410. The server may determine the data scraper by using a scraper configuration file associated with the data category (at 460). Alternatively or additionally, the server may determine the data scraper by constructing a data scraper based on the metatags that identify structured data (at 470).

Referring to 460, at 462, the server may determine a category ID that identifies the data category determined at 410. The server may utilize an index (e.g., an inverted index) that indexes data categories to category records that store the category IDs. The server may use other suitable techniques to determine the category ID of the data category determined at 410.

At 464, the server retrieves a scraper configuration file that correspond with the category ID determined at 462. The server may retrieve the scraper configuration file from a category data store that stores scraper configuration files corresponding with different category IDs. The scraper configuration file may include scraping parameters that the server can use to scrape. The scraper configuration file may indicate what data to scrape. For example, the scraper configuration file for a movie category may indicate the server to scrape a movie title from a particular tag, a movie image from an image tag, etc. The scraper configuration file may further indicate where to store the scraped data. For example, the scraper configuration file may indicate that the scraped data can be stored in an entity data store as entity records and/or in a card data store as card records.

Referring to 470, at 472, the server identifies metatags that refer to schema vocabulary. The server may identify the metatags referring to schema vocabulary by comparing the metatags with stored phrases in the schema vocabulary (e.g., schema.org). For example, the server may identify a metatag that stores information about a movie by identifying the following text in the metatag label: itemscope itemtype="http://schema.org/Movie". Similarly, the server may identify a metatag that stores information about an actor by identifying the following text in the metatag label: itemprop="actor" itemscope itemtype="http://schema.org/Person".

At 474, the server can configure a data scraper to extract information stored in the metatags identified at 472. The server can configure the data scraper based on the references that the tag labels make to the schema vocabulary. The server can configure the data scraper to extract all information that has been marked-up using the schema vocabulary. For example, the server can configure the data scraper to extract the actor's name stored between the metatags that have a metatag label specifying: itemprop="actor" itemscope itemtype="http://schema.org/Person".

At 480, the server uses a data scraper (e.g., the data scraper determined at 450) to extract (e.g., scrape) data. The server may configure the data scraper using a scraper configuration file (e.g., the scraper configuration file retrieved at 464). Alternatively or additionally, the server may configure the data scraper based on the metatags that are marked-up using schema vocabulary.

At 484 the server uses the scraped data (e.g., the data scraped at 480) to populate entity records in an entity data store and/or card records in a card data store. The server may use the scraped data to populate existing entity records and/or card records. Alternatively, the server may create new entity records and/or card records, and use the scraped data to populate the newly created entity records and/or card records. By populating the entity records and/or the card records with the scraped data, the server can use the scraped data to provide search results (e.g., cards).

Figure 4B:
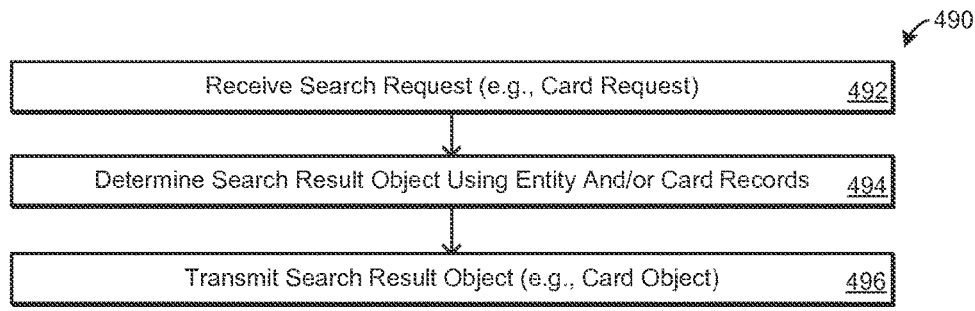
FIG. 4B is a block diagram that illustrates an example method for providing search results based on the scraped data.

FIG. 4B illustrates an example method 490 that can be implemented by a server to provide search results. At 492, the server receives a search request (e.g., a card request). The search request may include a search query with one or more search terms. Alternatively or additionally, the search request may include contextual data corresponding with a client computing device. The contextual data may indicate a location of the client computing device, the native applications installed on the client computing device, a native application currently being used at the client computing device, etc. The contextual data may include sensor measurements (e.g., an accelerometer reading, a gyroscope measurement, a device temperature, an ambient temperature, an ambient sound level, an ambient lighting level, etc.).

At 494, the server determines a search result object based on the search request. The search request may include a search query with one or more search terms. The search result object refers to a data container that includes search results. The search result object may be a card object that includes information on displaying cards. The server may use the entity records in the entity data store and/or the card records in the card data store to determine the search results. The server may determine the search results by identifying a consideration set of entity records and/or card records. The server may identify the consideration set by filtering out entity records and/or card records that do not match with the search query and/or the contextual data. Upon identifying the consideration set, the server may score (e.g., rank) the entity records and/or the card records in the consideration set. The server may use various scoring features (e.g., query scoring features, record scoring features and/or query-record scoring features) to score the records in the consideration set. Upon scoring the records in the consideration set, the server may select the highest scoring records to generate the search result object. The server can generate the search result object by creating a data container (e.g., a JSON file) and writing pertinent information from the selected records into the data container.

At 496, the server transmits the search result object (e.g., card object). The server may transmit the search result object directly to the client computing device at which the search request originated. Alternatively, the server may transmit the search result object to a partner computing system (e.g., an internet search engine, a cellular service provider, a social networking platform or a device manufacturer) that serves as an intermediary between the server and the client computing device.

Figure 5:
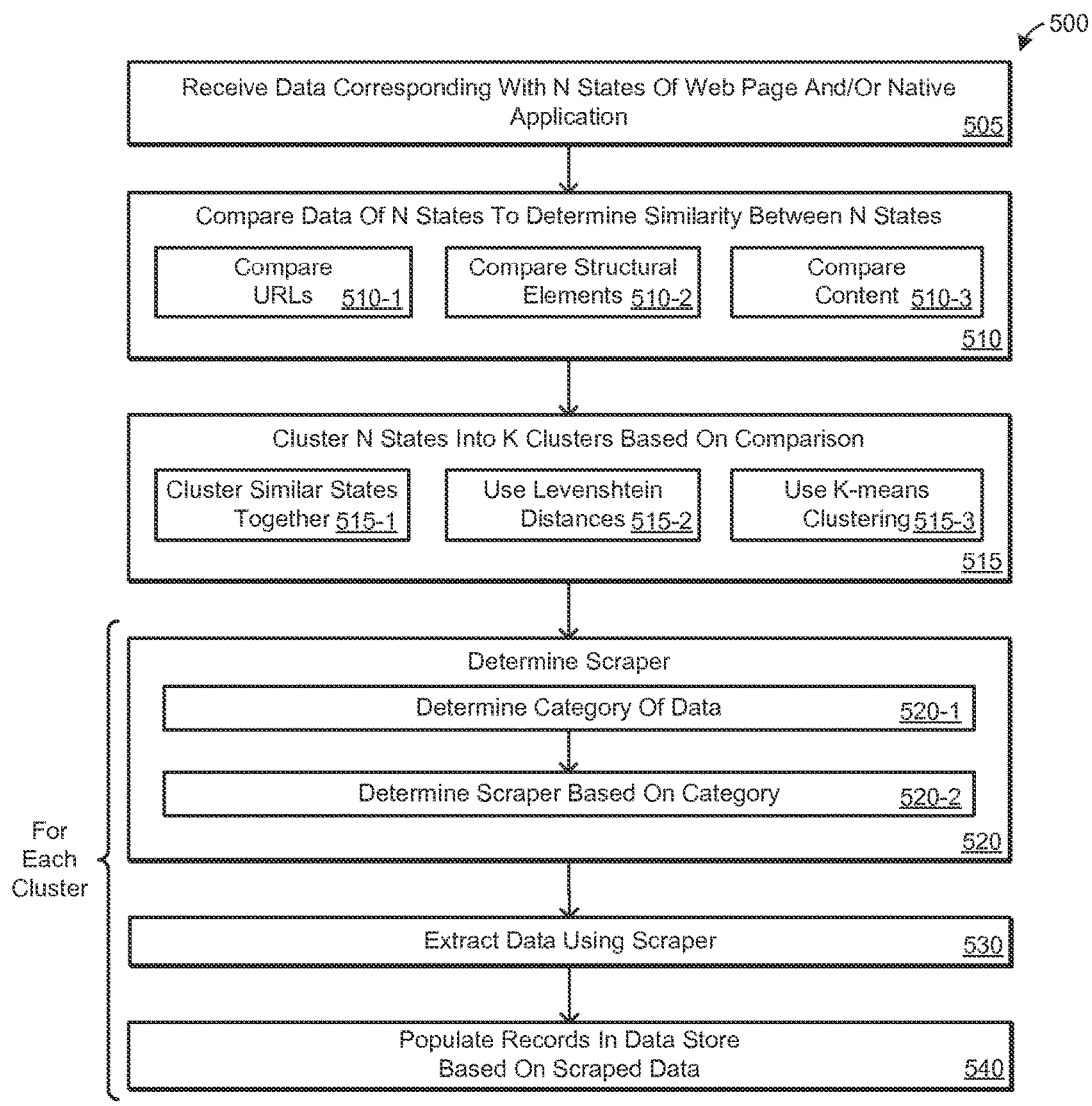
FIG. 5 is a block diagram that illustrates example methods for clustering crawled data and scraping the crawled data based on the data clusters.

FIG. 5 illustrates an example method 500 that may be used to cluster data and extract information from the data based on the clusters. The method 500 may be implemented by a server (e.g., the card server 200 shown in FIGS. 1, 2 and 3). At 505, the server receives data corresponding with N different states of a web page and/or a native application. N may be an integer greater than 2. The data may include N URLs, each URL may correspond with one of the N states of the web page or the native application. URLs that point to states of web pages may be referred to as web URLs. URLs that point to states of native applications may be referred to as application URLs or state access mechanisms.

In addition to or as an alternative to the data including N URLs, the data may include N sets of structural elements, each set of structural elements may correspond with one of the N states of the web page or the native application. The structural elements may indicate structures of the different states of the web page and/or the native application. For example, the data may indicate that the web page and/or the native application displays a heading (e.g., a movie name) at the top, an image (e.g., a movie poster) below the heading towards the left and text (e.g., a movie synopsis) on the right side of the image. The data may include tags (e.g., metatags, for example, HTML tags) that indicate the structure of the web page and/or the native application. In addition to or as an alternative to tags, the data may include activity objects that indicate the structure of the native application.

The data may indicate the content displayed by the N states of the web page and/or the native application. The data may indicate the content by including metatags that include references to a schema vocabulary (e.g., schema.org). The metatags may indicate the type of data that is stored between the metatags. For example, a particular metatag may indicate that the web page or the native application displays information about a movie by specifying: itemscope itemtype="http://schema.org/Movie". Similarly, other metatags may indicate additional information about the movie. For example, another metatag may indicate that the displayed information conveys the name of the movie's director by specifying: itemprop="actor" itemscope itemtype="http://schema.org/Person".

At 510, the server compares the data of the N states to determine the similarity between the N states. The server may determine the similarity between the N states by comparing the N URLs corresponding with the N states, at 510-1. Alternatively or additionally, the server may determine the similarity between the N states by comparing the N sets of structural elements corresponding with the N states, at 510-2. Alternatively of additionally, the server may determine the similarity between the N states by comparing the content displayed by the N states, at 510-3. The server may use other suitable techniques to determine the similarity between the N states.

At 515, the server clusters the N states into K clusters, where K is less than N. The server can cluster the N states into K clusters based on comparing the N states with each other. The server can use various techniques for clustering the N states into K clusters. For example, the server may identify states that are similar and cluster the similar states together, at 515-1. Alternatively or additionally, the server may use Levenshtein distances to determine which states to cluster together (at 515-2). Alternatively or additionally, the server may use K-means clustering to cluster the N states into K clusters (at 515-3). The server can use other clustering techniques, such as bi-clustering, tri-clustering, etc.

Referring to 515-2, the server may use Levenshtein distances to cluster the N states into K clusters. For example, the server may determine (e.g., compute) Levenshtein distances between the N URLs of the N states. Upon determining the Levenshtein distances between the N URLs, the server may cluster two URLs together in response to the Levenshtein distance between the two URLs being less than a threshold. The server may add another state to a cluster in response to the Levenshtein distance between the URL of the other state and the URLs of the states in the cluster being less than a threshold.

Similarly, the server may determine the Levenshtein distances between the N sets of structural elements. The server may represent each set of structural elements as a string. The server may compute Levenshtein distances between all the strings representing the N sets of structural elements. The server may cluster two states together in response to the Levenshtein distance between their representative strings being less than a threshold. The server may add an additional state to a cluster in response to the distance between the representative string of the additional state and the representative strings of the states in the cluster being less than a threshold.

Referring to 515-3, the server may use k-means clustering to cluster the N states into K clusters. K-means clustering aims to partition n observations (e.g., N states of a web page and/or a native application) into k clusters in which each observation (e.g., state) belongs to the cluster with the nearest mean, serving as a prototype of the cluster. This may result in a partitioning of the data space into Voronoi cells. Although k-means clustering may be NP-hard, certain heuristic techniques can be employed to facilitate a relatively quick convergence to a local optimum. The heuristic techniques are usually similar to expectation-maximization techniques for mixtures of Gaussian distributions via an iterative refinement. In other words, given a set of observations $(x_1, x_2, \ldots, x_N)$, where each observation is a d-dimensional real vector, k-means clustering aims to partition the n observations into k ($\leq$n) sets $S=\{S_1, S_2, \ldots, S_k\}$ so as to minimize the within-cluster sum of square (WCSS). This can also be expressed as following:

$$\operatorname*{argmin}_{S} \sum_{i=1}^{k} \sum_{x \in S_i} \|x - \mu_i\|^2 \quad (1)$$

where $\mu_i$ is the mean of points in $S_i$.

For each cluster, the server determines a scraper (at 520), uses the scraper to scrape data from the states in the cluster (at 530) and populates entity records and/or card records based on the scraped data (at 540). Referring to 520, the server can determine the scraper for a particular cluster by determining a data category of the states in the cluster (at 520-1) and determining the scraper based on the data category (at 520-2). The server may determine the data category at 520-1 based on techniques discussed in relation to block 410 in FIG. 4. Similarly, the server may determine the scraper at 520-2 based on techniques discussed in relation to block 450 in FIG. 4. The server may use other suitable techniques to determine the scraper for a particular cluster.

Referring to 530, the server may extract information from the crawled data based on techniques discussed in relation to block 480 in FIG. 4. The server may use other suitable techniques to extract information from the crawled data. Similarly, the server may populate records at 540 based on techniques discussed in relation to block 484 in FIG. 4. The server may use other suitable techniques to populate records in a data store. The scraped data may be used to provide search results in response to a search query (e.g., as illustrated in FIG. 4B). The scraped data can be used to provide card objects in response to a card request. The scraped data can be used for other purposes.

The server can further categorize a data category into subcategories and apply subcategory-specific scrapers to the crawled data. For example, the server may categorize the crawled data into a movie category. In this example, the server can categorize the crawled data into a 'movie with poster' subcategory and a 'movie without poster' category. For crawled data in the 'movie with poster' category, the server can use a scraper that is configured to extract the poster along with other movie related information. Similarly, for crawled data in the 'movie without poster' category, the serve can use a scraper that is configured to extract the movie related information and not the absent movie poster.

The server may subcategorize the crawled data into sub categories, for example, if applying the category-specific scraper on the crawled data results in unpopulated fields. For example, after the server determines a data category for the crawled data to be a movie category, the server can apply the movie scraper to the crawled data. The movie scraper may be configured to extract movie names, movie posters, director name, actor names, etc. However, some movies may not include a movie poster. In such scenarios, the movie scraper may fail to extract the director name and the actor names. Upon detecting that there are several unpopulated fields after the movie scraper has been applied to the crawled data, the server can subcategorize a portion of the crawled data that corresponds with the unpopulated fields. For example, the server may subcategorize that portion of the crawled data into the 'movie without poster' subcategory and apply the 'movie without poster' scraper to that portion of the crawled data. Advantageously, by analyzing the output of the category-specific scraper and using subcategory-specific scrapers as needed, the server may extract additional information from the crawled data.

Figure 6:
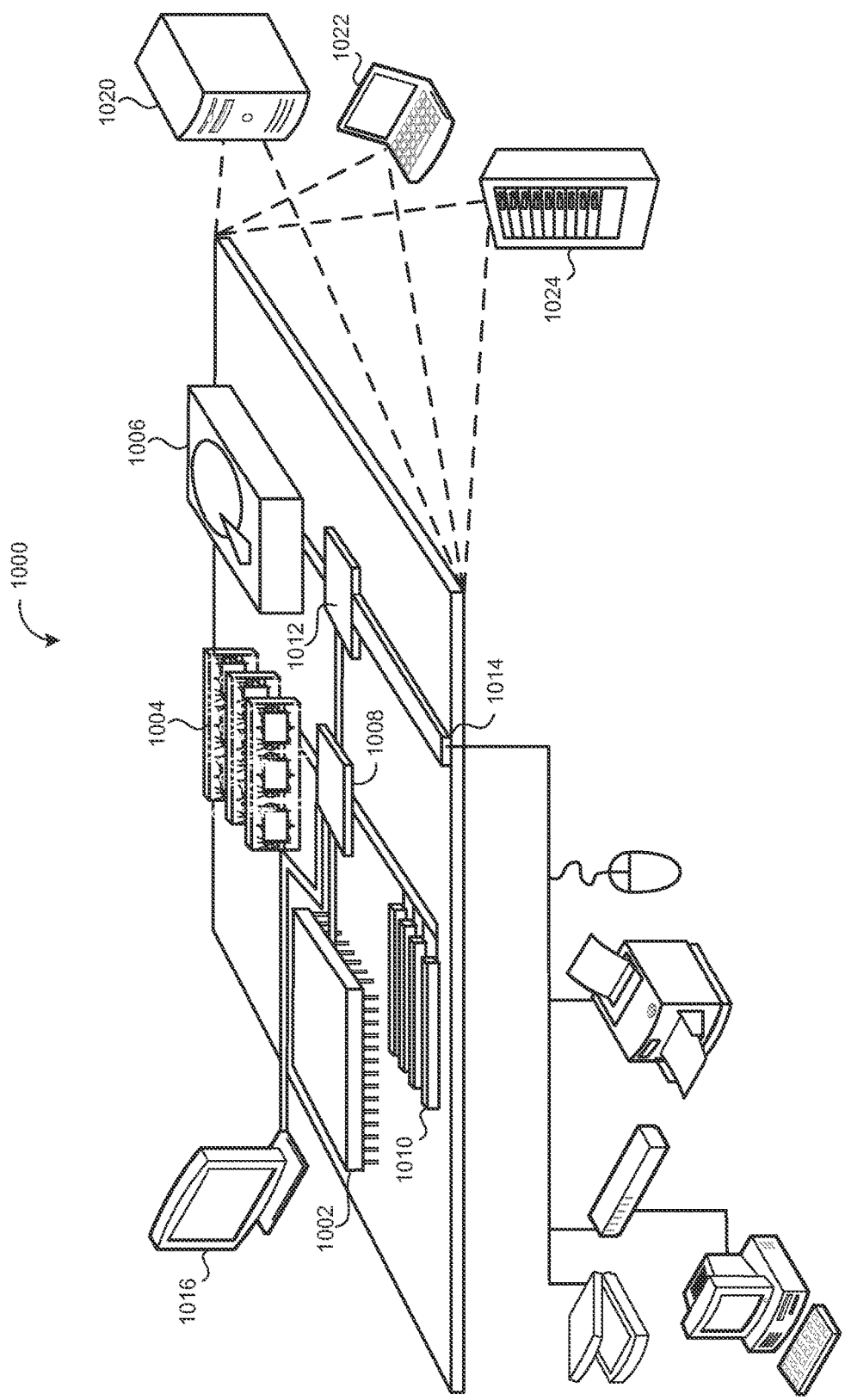
FIG. 6 is a block diagram of an example computing device.

FIG. 6 is a block diagram of an example computing device 1000 that may be used to implement the systems and methods described in this document. For example, the computing device 1000 may be used to implement the system 100, the web server 110, the application server 130, the client computing device 150 and/or the card server 200 shown in FIG. 1. The computing device 1000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the disclosure described and/or claimed in this document.

The computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a graphical user interface (GUI) on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a computer-readable medium. In one implementation, the memory 1004 is a volatile memory unit or units. In another implementation, the memory 1004 is a non-volatile memory unit or units.

The storage device 1006 is capable of providing mass storage for the computing device 1000. In some implementations, the storage device 1006 is a computer-readable medium. In various different implementations, the storage device 1006 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of duties is exemplary only. In some implementations, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device, such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer, such as a laptop computer 1022. Alternatively, components from computing device 1000 may be combined with other components in a mobile device (not shown). Each of such devices may contain one or more of computing device 1000, and an entire system may be made up of multiple computing devices 1000 communicating with each other.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

APPENDIX

Following is pseudo code for example movie scrapers. In these examples, movie scraper 1 is for movies with posters and movie scraper 2 is for movies without posters. As illustrated in the pseudo HTML, web pages that display information about movies without posters may have a different HTML structure (e.g., fewer tags).

| Pseudo HTML for movie with poster | Pseudo Code for Movie scraper 1 |
|---|---|
| <div>Movie ID</div> <div>Movie Genre</div> <div>Movie Title</div> <div>Release Year</div> <div>Story Line</div> <div>Rating</div> <div>Movie Poster</div> <div>Director</div> <div>Actors</div> | Movie['title']=.../div[3]... Movie['poster']=.../div[7]... Movie['director']=.../div[8]... Movie['actor']=.../div[9]... |

| Pseudo HTML for movie without poster | Pseudo Code for Movie scraper 2 |
|---|---|
| <div>Movie ID</div> <div>Movie Genre</div> <div>Movie Title</div> <div>Release Year</div> <div>Story Line</div> <div>Rating</div> <div>Director</div> <div>Actors</div> | Movie['title']=.../div[3]... Movie['director']=.../div[7]... Movie['actor']=.../div[8]... |

What is claimed is:

1. A server comprising:
a network communication device;
a storage device comprising:
a category data store that stores category records corresponding with data categories, each of the stored category records comprising a category identifier (ID) that identifies the category record and a uniform resource locator (URL) pattern associated with the data category,
an entity data store that stores entity records, and
a card data store that stores card records; and
a processing device that executes computer-readable instructions that, if executed by the processing device, cause the processing device to:
receive data corresponding with a web page and/or a native application, the data comprising a uniform resource locator (URL),
compare the URL included in the data with the URL patterns stored in the category data store, one of the URL patterns indicating a portion of the URL,
determine a data category of the data based on the comparison of the URL with the URL pattern,
determine a data scraper based on the determined data category of the data, the determined data scraper comprising a scraper configuration that enables the determined data scraper to extract information from the web page and/or the native application,
scrape the web page and/or the native application by extracting information from the web page and/or the native application using the determined data scraper,
populate one or more entity records in the entity data store and/or one or more card records in the card data store based on the scraped data,
receive a card request, the card request comprising one or more search terms and/or contextual data,
determine a card record from the card data store based on the received card request,
generate a card object based on the determined card record, and
transmit the generated card object via the network communication device.

2. The server of claim 1, wherein the comparing of the URL with the URL pattern comprises using an inverted index that indexes the URL patterns to the category records.

3. The server of claim 1, wherein the comparing of the URL with the URL patterns comprises, for each URL pattern, determining a Levenshtein distance between the URL and the URL pattern.

4. The server of claim 3, wherein the determining of the data category comprises identifying the URL pattern with the lowest Levenshtein distance and selecting the category ID associated therewith.

5. The server of claim 1, wherein the determining of the data category comprises identifying the URL pattern that matches the URL and selecting the category ID associated therewith.

6. The server of claim 1,
wherein the storage device further comprises a scraper data store that stores scraper configuration files comprising:
a file ID that identifies the scraper configuration file,
a category ID that identifies the data category associated with the scraper configuration file, and
scraping parameters, and
wherein the determining of the data scraper comprises retrieving the scraper configuration file associated with the data category of the data.

7. The server of claim 1, wherein the determining of the card record comprises performing a search of the card data store and/or the entity data store based on the search terms and/or the contextual data in the received card request.

8. The server of claim 1, wherein the generating of the card object comprises:
creating a data container, and
writing information from the determined card record to the data container.

9. A server comprising:
a network communication device;
a storage device comprising:
a category data store that stores category records corresponding with data categories, each of the category records comprising a category identifier (ID) that identifies the category record and a structural pattern associated with the data category, the structural pattern indicating the structure of a web page and/or a native application,
an entity data store that stores entity records, and
a card data store that stores card records; and
a processing device that executes computer-readable instructions that, if executed by the processing device, cause the processing device to:
receive data corresponding with a web page and/or a native application, the data comprising metadata that indicates a structure of the web page and/or the native application, compare the structure indicated by the metadata with the structural patterns stored in the category data store,
determine a data category of the data based on the comparison of the metadata with the structural patterns,
determine a data scraper based on the determined data category of the data, the determined data scraper comprising a scraper configuration that enables the determined data scraper to extract information from the web page and/or the native application,
scrape the web page and/or the native application for scraped data by extracting information from the web page and/or the native application using the determined data scraper,
populate one or more entity records in the entity data store and/or one or more card records in the card data store based on the scraped data,
receive a card request, the card request comprising one or more search terms and/or contextual data,
determine a card record from the card data store based on the received card request,
generate a card object based on the determined card record, and
transmit the generated card object via the network communication device.

10. The server of claim 9, wherein the metadata indicating the structure of the web page and/or the native application comprises metatags that refer to graphical user interface (GUI) elements displayed by the web page and/or the native application, the GUI elements comprising data fields, images, labels, buttons and/or drop-down menus.

11. The server of claim 9, wherein the comparing of the structure with the structural patterns comprises using an inverted index that indexes the structural patterns to the category records.

12. The server of claim 9, wherein the comparing of the structure with the structural patterns comprises, for each structural pattern, determining a Levenshtein distance between the structure and the structural pattern.

13. The server of claim 12, wherein the determining of the data category comprises identifying the structural pattern with the smallest Levenshtein distance and selecting the category ID associated therewith.

14. The server of claim 9, wherein the determining of the data category comprises identifying the structural pattern that matches the structure and selecting the category ID associated therewith.

15. A server comprising:
a network communication device;
a storage device comprising:
    a category data store that stores category records corresponding with data categories, each of the category records comprising a category identifier (ID) that identifies the category record and metatag patterns associated with the data category, the metatag patterns indicating content displayed by a web page and/or a native application, and
    an entity data store that stores entity records; and
a processing device that executes computer-readable instructions that, if executed by the processing device, cause the processing device to:
    receive data corresponding with a web page and/or a native application, the data comprising metadata that includes metatag pairs, each metatag pair comprising a tag label and a value interposed between the metatag pair,
    compare the tag labels with the metatag patterns stored in the category data store,
    determine a data category of the data based on the comparison of the metadata with the metatag patterns,
    determine a data scraper based on the determined data category of the data, the determined data scraper comprising a scraper configuration that enables the determined data scraper to extract information from the web page and/or the native application,
    scrape the web page and/or the native application by extracting information from the web page and/or the native application using the determined data scraper,
    populate one or more entity records in the entity data store based on the scraped data,
    receive a search request, the search request comprising one or more search terms and/or contextual data,
    determine one or more entity records from the entity data store based on the search request,
    generate a result object based on the determined entity records, and
    transmit the result object via the network communication device.

16. The server of claim 15, wherein the comparing of the tag labels with the metatag patterns comprises using an inverted index that indexes the metatag patterns to the category records.

17. The server of claim 15, wherein the determining of the data category comprises identifying the metatag pattern that matches the tag labels and selecting the category ID associated therewith.

18. The server of claim 15, wherein the metatag patterns include vocabulary from a schema that is used to markup data.

19. The server of claim 15, wherein the metatag patterns include uniform resource locators (URLs) that identify entity types, relationships between entities and/or actions.

20. A server comprising:
a network communication device;
a storage device comprising an entity data store that stores entity records; and
a processing device that executes computer-readable instructions that, if executed by the processing device, cause the processing device to:
    receive data corresponding with n states of a web page and/or a native application, n being greater than one, the data comprising n uniform resource locators (URLs) associated with respective states,
    compare the data of the n states with each other to determine similarity between the n states,
    cluster the n states into k clusters based on the comparison, k being less than n and greater than one,
    for each cluster, determine a data scraper based on a structure of the data in the cluster, scrape the states of the web page and/or the native application indicated by the URLs in the cluster, and populate one or more entity records in the entity data store using the scraped data,
    receive a search request, the search request comprising one or more search terms and/or contextual data,
    determine one or more entity records from the entity data store based on the search request,
    generate a result object based on the determined entity records, and
    transmit the generated result object via the network communication device.

21. The server of claim 20, wherein the comparing of the data of the n states comprises comparing the n URLs with each other to determine the similarity between the n URLs.

22. The server of claim 21, wherein the clustering of the n states into the k clusters comprises clustering the URLs that are similar to each other.

23. The server of claim 22,
wherein the comparing of the URLs comprises determining a Levenshtein distance between the URLs, and
wherein the clustering of the URLs comprises clustering URLs in response to the Levenshtein distance between the URLs being less than a threshold.

24. The server of claim 20,
wherein the data comprises metadata for each of the n states, the metadata indicating graphical user interface (GUI) elements of the web page and/or the native applications, and
wherein the comparing of the data comprises comparing the GUI elements.

25. The server of claim 20, wherein the clustering of the n states into k clusters comprises using k-means clustering.

26. A server comprising:
a network communication device;
a storage device comprising an entity data store that stores entity records and a card data store that stores card records; and
a processing device that executes computer-readable instructions that, if executed by the processing device, cause the processing device to:
receive data corresponding with a web page and/or a native application, the data comprising a uniform resource locator (URL), metadata indicating a structure of the web page and/or the native application, and/or content displayed by the web page and/or the native application,
determine a category of the data based on the URL of the web page and/or the native application, the structure of the web page and/or the native application indicated by the metadata, and/or the content displayed by the web page and/or the native application,
determine a scraper based on the category of the data, the scraper comprising a configuration that enables the scraper to extract information from the web page and/or the native application,
scrape the web page and/or the native application for scraped data by extracting information from the web page and/or the native application using the scraper, and
populate one or more entity records in the entity data store and/or one or more card records in the card data store based on the scraped data.

27. The server of claim 26, wherein the computer-readable instructions further cause the processing device to:
receive a card request comprising one or more search terms and/or contextual data,
determine a card record from the card data store based on the received card request,
construct a card object that includes information from the determined card record, and
transmit the constructed card object.

28. The server of claim 26,
wherein the storage device stores URL patterns associated with known categories, and
wherein the determining of the category of the data comprises:
comparing the URL of the web page and/or the native application with the URL patterns of known categories stored in the storage device;
determining that the URL of the web page and/or the native application matches one of the URL patterns stored in the storage device; and
selecting the category associated with the matching URL pattern as the category of the data.

29. The server of claim 26,
wherein the storage device stores structural patterns associated with known categories, and
wherein the determining of the category of the data comprises:
comparing the metadata indicating the structure of the web page and/or the native application with the structural patterns of known categories stored in the storage device;
determining that the structure of the web page and/or the native application matches one of the structural patterns stored in the storage device; and
selecting the category associated with the matching structural pattern as the category of the data.

30. The server of claim 26,
wherein the storage device stores categorized content associated with known categories, and
wherein the determining of the category of the data comprises:
comparing the content displayed by the web page and/or the native application with the categorized content stored in the storage device;
determining that the content displayed by the web page and/or the native application matches the categorized content associated with one of the known categories; and
selecting the category associated with the matching categorized content as the category of the data.

* * * * *